US008834151B2

(12) United States Patent
Epshetsky

(10) Patent No.: US 8,834,151 B2
(45) Date of Patent: Sep. 16, 2014

(54) APPARATUS FOR FABRICATING PARTS AND METHOD OF FORMING THE APPARATUS

(75) Inventor: Yefim Epshetsky, Schaumburg, IL (US)

(73) Assignee: Aktiebolaget SKF, Gothenburg (SE)

( * ) Notice: Subject to any disclaimer, the term of this patent is extended or adjusted under 35 U.S.C. 154(b) by 198 days.

(21) Appl. No.: 13/249,974

(22) Filed: Sep. 30, 2011

(65) Prior Publication Data

US 2013/0082419 A1   Apr. 4, 2013

(51) Int. Cl.
*B29C 33/20*   (2006.01)
(52) U.S. Cl.
USPC .......................................................... 425/589
(58) Field of Classification Search
CPC ....................................................... B29C 33/20
USPC .......................................................... 425/589
See application file for complete search history.

(56) References Cited

U.S. PATENT DOCUMENTS

| 4,521,172 A | 6/1985 | Gilbert |
| 6,558,149 B1 | 5/2003 | Bodmer et al. |
| 2011/0193261 A1* | 8/2011 | Uragami et al. .............. 264/279 |

FOREIGN PATENT DOCUMENTS

GB    2110970 A  *  6/1983

* cited by examiner

*Primary Examiner* — Alison Hindenlang
(74) *Attorney, Agent, or Firm* — Inventa Capital PLC

(57) ABSTRACT

An apparatus for receiving a mold assembly having a first mold portion and a second mold portion operably connected with one another for forming parts. The apparatus includes a mold holding member and a pair of support members spaced from one another and extending from the mold holding member to a manufacturing floor. A carriage device is cooperable with the mold holding member for engaging and moving the mold assembly. A lifting mechanism of the apparatus is used for moving the carriage device relative the mold holding member to move the mold assembly to be engaged with mold holding member. The lifting mechanism and the carriage device apply forces to opposite surfaces of the mold holding member to prevent the mold holding member from deflection and distortion to eliminate offset between the first mold portion and the second mold portion thereby eliminating defective parts as said apparatus forms the parts.

9 Claims, 3 Drawing Sheets

APPARATUS FOR FABRICATING PARTS AND METHOD OF FORMING THE APPARATUS

FIELD OF THE INVENTION

The present invention relates to molding machines particularly, but not exclusively for use in the molding of rubber or plastics.

BACKGROUND OF THE INVENTION

Injection molding is a manufacturing process for producing parts from both thermoplastic and thermosetting plastic materials. Material is fed into a heated barrel, mixed, and forced into a mold cavity where it cools and hardens to the configuration of the mold cavity. After a product is designed, usually by an industrial designer or an engineer, molds are made by a moldmaker (or toolmaker) from metal, usually either steel or aluminum, and precision-machined to form the features of the desired part. Injection molding is widely used for manufacturing a variety of parts, from the smallest component to entire body panels of cars.

The art of molding machines used in injection molding is replete with various designs. One of such designs is taught by U.S. Pat. No. 4,521,172 to Gilbert. U.S. Pat. No. 4,521,172 to Gilbert teaches a press apparatus comprising two side frame members and a top plate between the side frame members and a lower table below the top plate. A fixed platen is mounted to the top plate. The platen is connected to the respective halves of a mold device. In all operational modes and when the press apparatus is not forming parts, the mold device applies additional weight to the top plate, which results in deflection and distortion of the top plate. The top plate deflected under the additional weight further results in offset between the respective halves of a mold device thereby forming defective parts.

Another prior art reference, such as U.S. Pat. No. 6,558,149 to Bodmer et al., for example, teaches an injection molding apparatus. A mold holding plate includes one of the injection molding mold halves. Similar to the U.S. Pat. No. 4,521,172 to Gilbert, the weight of the molding mold half applied to the mold holding plate results in deflection and distortion of the mold holding plate, which results in offset between the respective molding mold halves, which in return further results in defective parts formed by the injection molding apparatus.

Still another prior art reference, teaches a mold apparatus having a mold holding member and a pair of supports extending from the mold holding member to define a frame. A mold device for molding parts is positioned within the frame. A lifting device is connected to the frame and is positioned beyond the frame. The lifting device is also connected to the mold device as the mold device is hanging on the mold holding member.

In different operational modes, the lifting device moves the mold device to and away from the mold holding plate. In all operational modes and when the mold apparatus is not forming parts, the mold device applies additional weight to the mold holding member which results in deflection and distortion of the mold holding member, which results in offset between the first mold portion and the second mold portion thereby further resulting in defective parts formed by the mold apparatus.

Therefore, an opportunity exists for an improved molding apparatus for holding a mold assembly including first and second mold portions. Moreover, the opportunity exists for the molding machine configured to withstand deflection and distortion as the molding machine is in operational use with the mold assembly connected to and hanging from a top portion or a mold holding member of the molding machine thereby eliminating offset between the first mold portion and the second mold portion to prevent production of defective parts as the molding apparatus forms the parts.

SUMMARY OF THE INVENTION

A present invention relates to a molding apparatus (the apparatus) used for fabricating parts made from rubber, plastics, metal and metal alloys. The apparatus receives a mold assembly that includes a first mold portion and a second mold portion operably connected with one another to define a cavity therebetween to receive at least one of polymeric, non-polymeric materials for forming parts. The apparatus includes a mold holding member presenting opposite surfaces.

A pair of support members is spaced from one another and extend from the mold holding member to a manufacturing floor. A carriage device is cooperable with the mold holding member for engaging and moving the mold assembly. A lifting mechanism of the apparatus is used for moving the carriage device relative the mold holding member to move the mold assembly to be engaged with the mold holding member.

In operation the lifting mechanism applies first force at one of the opposite surfaces as the mold assembly applies second force to the other opposite surface. As first and second forces are applied against each other, the lifting mechanism engages and moves the mold assembly against the mold holding member thereby preventing the mold holding member from deflection and distortion to eliminate offset between the first mold portion and the second mold portion thereby eliminating defective parts as the apparatus forms the parts.

An advantage of the present invention is to provide the improved apparatus and method for molding various parts wherein the design of the apparatus allows elimination of any potential offset as the first mold portion and the second mold portion present a straight plane parallel with the mold holding member as the mold holding member is prevented from deflection and distortion.

Another advantage of the present invention is to provide the improved design of the apparatus for forming parts wherein the unique design eliminates offset between the first mold portion and the second mold portion thereby eliminating fabrication of the defective parts.

Still another advantage of the present invention is to provide the improved design of the apparatus that utilized application of opposite forces applied to the mold holding member thereby preventing the mold holding member from being deflected.

Still another advantage of the present invention is to provide the improved apparatus for forming parts that is compact in design and can be utilized in various industrial applications.

BRIEF DESCRIPTION OF THE DRAWINGS

Other advantages of the present invention will be readily appreciated as the same becomes better understood by reference to the following detailed description when considered in connection with the accompanying drawings wherein.

DESCRIPTION OF THE INVENTION

Figure 1:
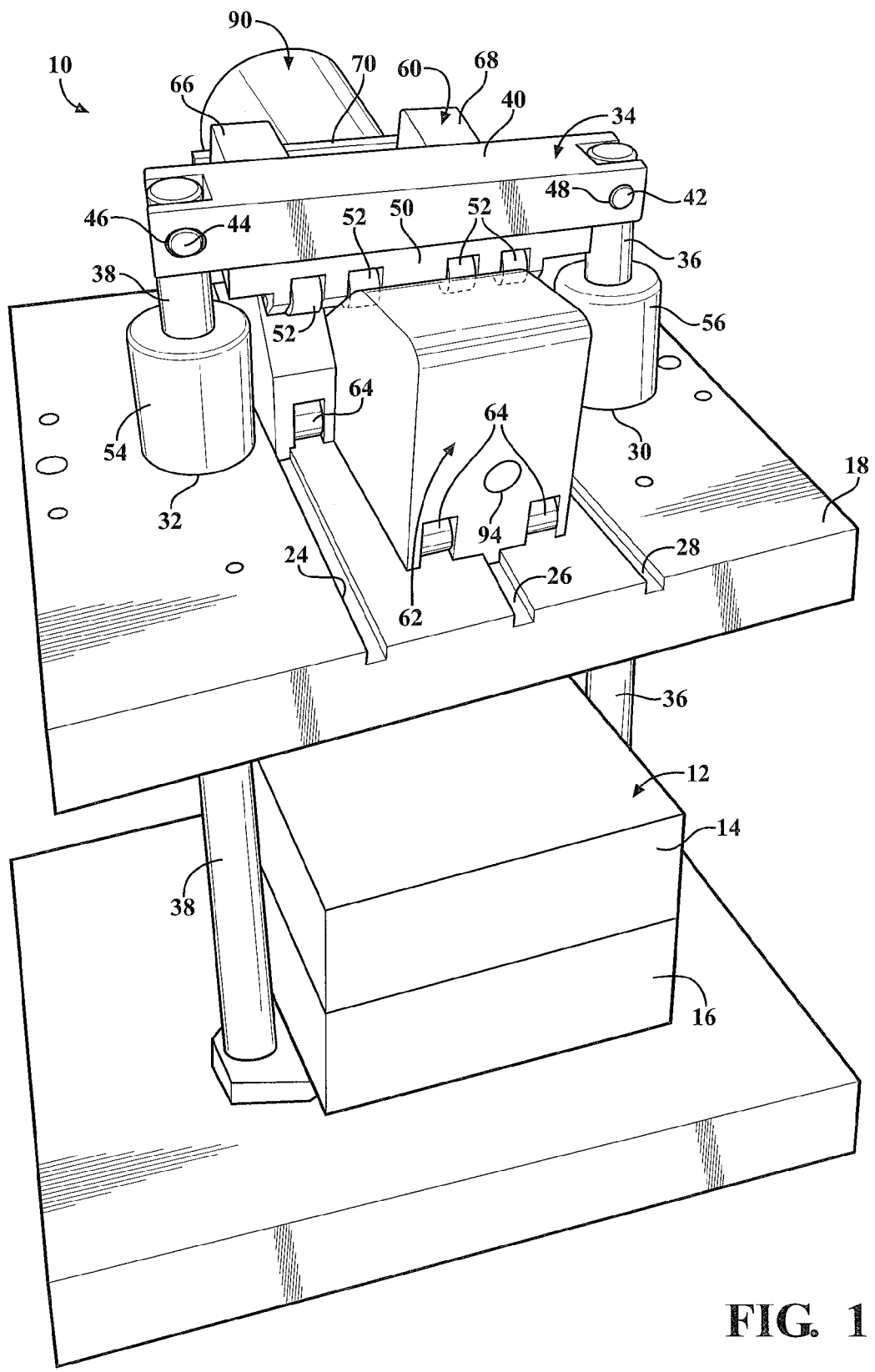
FIG. 1 illustrates a perspective view of an apparatus of the present invention for fabricating parts.
Figure 2:
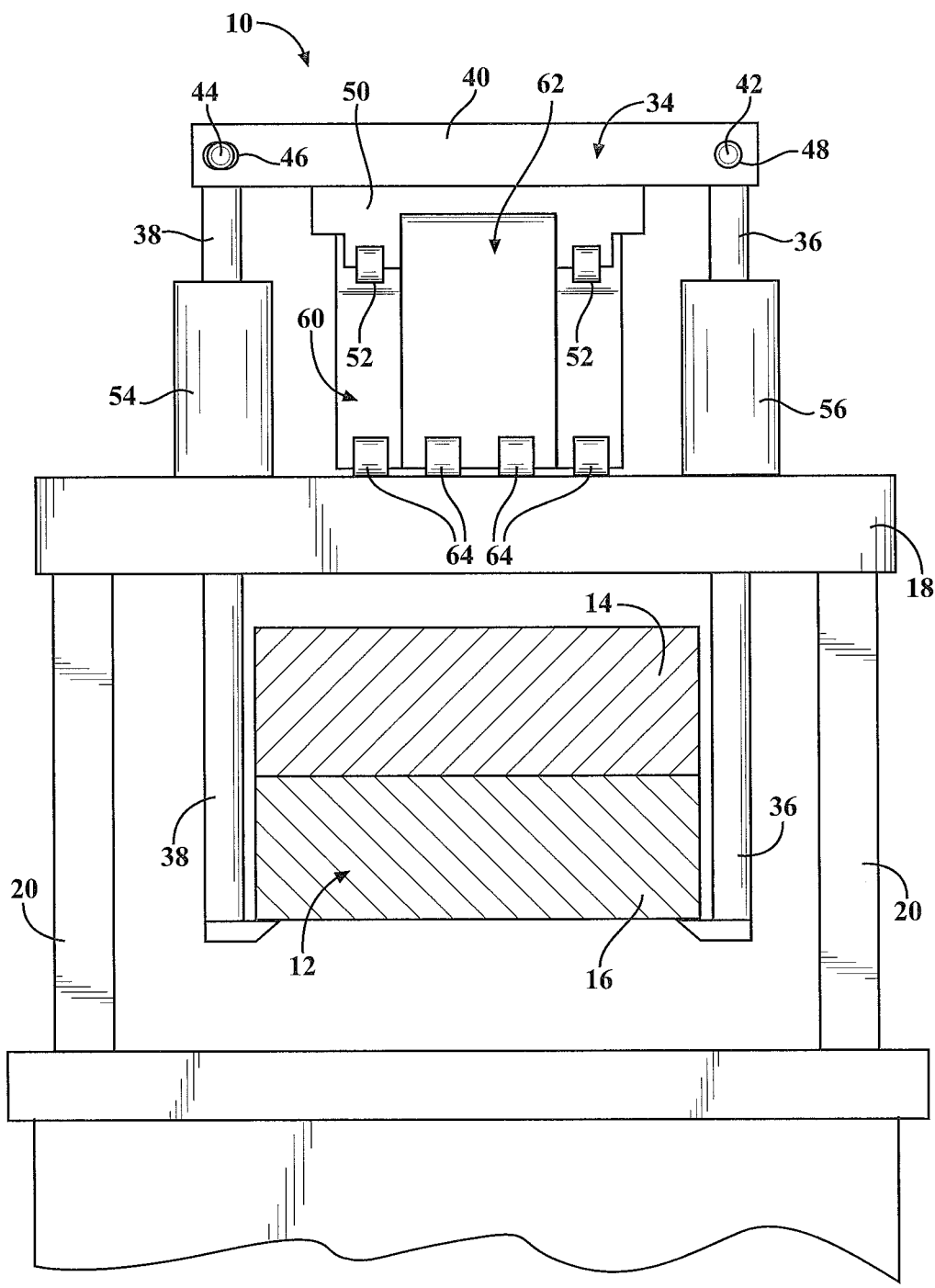
FIG. 2 illustrates a side view of the apparatus of the present invention.
Figure 3:
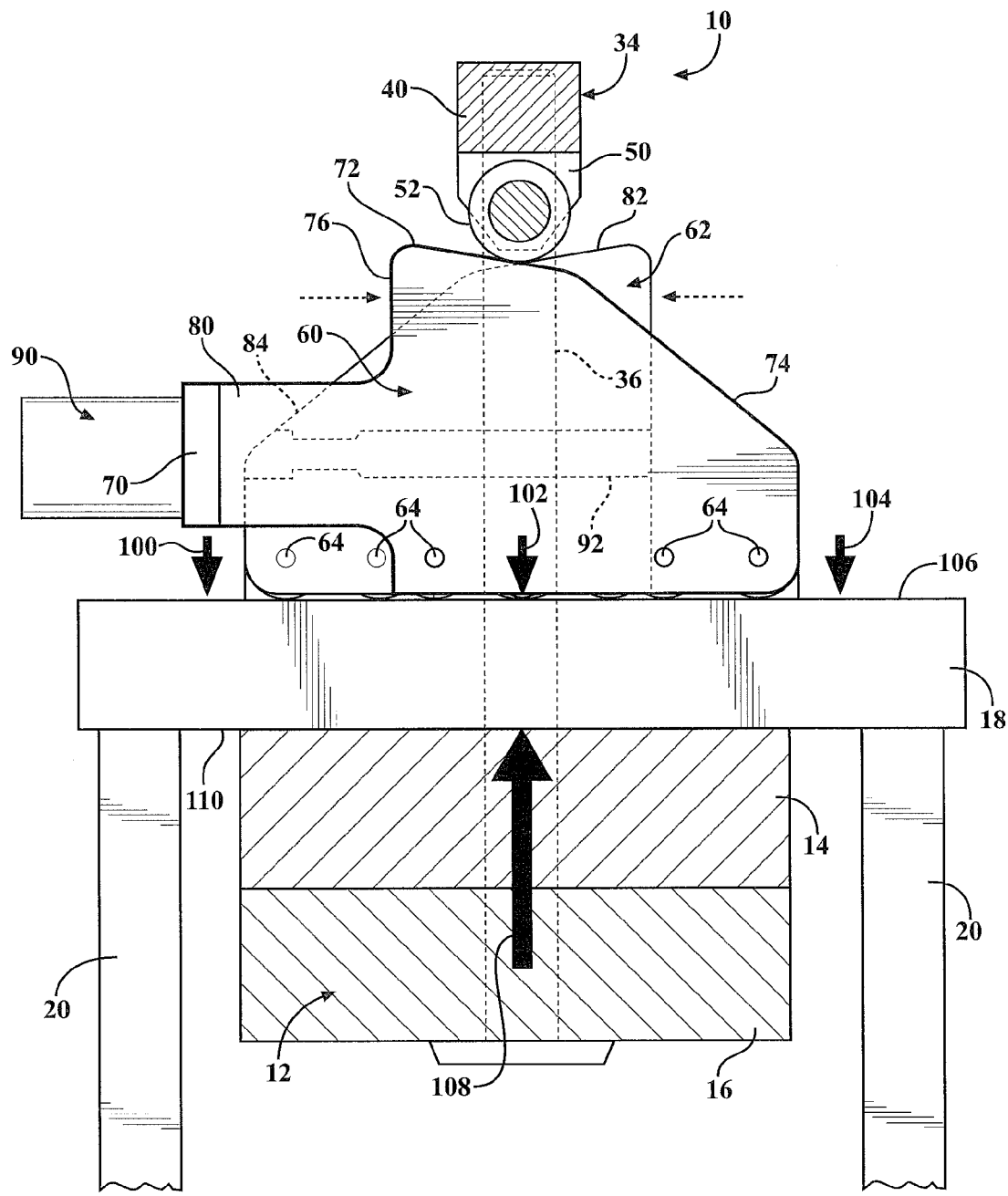
FIG. 3 illustrates a side view of a mold holding member platform with two blocks positioned on the platform and a carriage device resting on the blocks for moving the mold assembly to the mold holding member thereby utilizing application of opposite forces applied to opposite sides of the mold holding member to eliminate deflection of the mold holding member.

Referring to FIGS. 1 through 3, wherein like numerals indicate like or corresponding parts throughout the several views, a molding apparatus (the apparatus), generally shown at 10, is used for fabricating parts made from rubber, plastics, metal and metal alloys. The apparatus 10 receives a mold assembly, generally indicated at 12 that includes a first mold portion or half 14 and a second mold portion or half 16 operably connected with one another to define a cavity therebetween (not shown) to receive at least one of polymeric, non-polymeric materials for forming parts.

Alternatively, the apparatus 10 is also configured to perform stamping operations wherein blanks of at least one of metallic and organic materials (not shown) are placed between the first mold portion 14 and the second mold portion 14 thereby stamping parts (not shown). A worksurface or a mold holding plate 18 includes a supporting member or a pair of support members 20 to position the worksurface 18 above a manufacturing floor (not illustrated). A plurality of tracks 24, 26, and 28 are defined in the worksurface 18. The mold holding member 18 is configured to perform injection molding operations thereby injecting there through at least one of metallic and organic materials between the first mold portion 14 and the second mold portion 16 thereby molding the parts (not shown).

A pair of inlets 30 and 32 are also defined in the worksurface 18. A carriage device, generally indicated at 34, is used to lift and lower the mold assembly 12 relative the worksurface 18. The carriage device 34 includes a pair of shafts 36 and 38 interconnected by a bar element 40. The shafts 36 and 38 extend through the inlets 30 and 32. The bar element 40 is pivotably connected to each shafts 36 and 38 by respective pins 42 and 44 extending through slots 46 and 48 defined in the bar element 40 and extending through the shafts 36 and 38. The slot 46 presents a substantially oval configuration to form an offset to allow each shaft 36 and 38 includes respective locking elements (not shown) to engage the mold.

Alluding to the above, the bar member 40 includes a device 50 connected to the bar member 40. The device 50 presents a plurality of rollers 52 rotatably connected thereto. The functionality and the purpose of the rollers 52 will be described further below. A pair of tubular members 54 and 56 surround the shaft 36 and 38 thereby improving alignment of the shafts 36 and 38 relative the inlets 30 and 32.

The apparatus 10 includes a lifting device presented by a first block, i.e. a female element, generally indicated at 60, and a second, i.e. a male element, generally indicated at 62. Both elements 60 and 62 include rollers 64 thereby allowing the elements 60 and 62 to move relative each other along the tracks 24, 26, and 28. The female element 60 includes a pair of side walls 66, 68 interconnected by a plate 70 thereby forming a gate defined between the side walls 66, 68 to receive the male element 62.

As best illustrated in FIG. 3, each side wall 66 and 68 of the female element 60 presents an engaging surface defined by a first portion or a first inclined surface 72 and a second portion or a second inclined surface 74 and a back side 76. The back side 76 extends generally perpendicular to the worksurface 18. The back sides 76 of the side walls 66 and 68 include a tail portion 80 extending therefrom and interconnected by the plate 70 to receive the male element 62 as the male and female elements 60 and 62 are movable relative one another thereby moving the carriage device 34 above the worksurface 18.

The male element 62 presents a unitary body designed to be disposed in the gate defined between the side walls 66 and 68. Similar to the side walls of the female element 60, the male element 62 includes a first inclined surface 82 and a second inclined surface or slope, as shown in phantom at 84.

An adjusting device, such as actuator, is generally indicated at 90. The actuator 90 is connected to the plate 70 and includes a threaded shaft 92 mechanically engaged and rotatable relative the male element 62. The actuator 90 may include electrical, mechanical, hydraulic designs and the type, size, and configuration of the actuator 90 is not intended to limit the scope of the present invention. The actuator 90 may be cooperable with other components of the apparatus 10 in order to move the female element 60 and the male element 62 relative one another.

In operational mode of the apparatus 10, the actuator 90 rotates the shaft 92 which meshingly (mechanically) engages a female connector 94 defined in the male element 62. As the male element 62 enters the gate defined by the side walls 66 and 68, the rollers 52 of the engaging surface of the device 50 are captured by a V-shaped nest defined by the second inclined surface or slope 84 of the male element 62 and the second inclined surface or slope 74 of the female element 60.

As the male element 62 enters the gate of the female element 60, the rollers 52 slide upwardly over the slopes 74 and 84 thereby raising the shafts 36 and 38 above the worksurface 18. As the male element 62 is moved out of the gate of the female element 60, the rollers 52 slide downwardly over the slopes 74 and 84 thereby lowering the shafts 36 and 38 relative the worksurface 18.

Alluding to the above, the lifting mechanism defined by the female element 60 and the female element 62 applies a first force, shown at 100, 102, and 104 at one of the opposite surfaces 106 of the worksurface 18 as the mold assembly 12 engaged by the shafts 36 and 38 applies a second force, shown at 108 to the other opposite surface 110 of the worksurface 18. As first and second forces are applied against each other, as shown by the arrowheads 100, 102, 104, illustrating the first force and the arrowhead 108 illustrating the second force, the carriage device 34 engages and moves the mold assembly 12 against the worksurface 18 thereby preventing the worksurface 18 from deflection and distortion to eliminate offset between the first mold portion 14 and the second mold portion 16 thereby eliminating defective parts as the apparatus 10 forms the parts.

As the apparatus 10 is idle and does not perform any molding or stamping operations, where no first and second forces are applied against the opposite sides 106 and 110 the worksurface 18, no deflection and distortion of the worksurface 18 take place because the weight of the lifting mechanism and the carriage device 34 applied to the worksurface 18 is predetermined to prevent the worksurface 18 to be deflected or distorted, thereby allowing the worksurface 18 to maintain a straight plane free of deflection and distortion.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An apparatus for receiving a mold assembly having a first mold portion and a second mold portion operably connected to said apparatus for forming parts, said apparatus comprising:
   a mold holding member defining opposite surfaces;
   a pair of support members spaced from one another and extending from said mold holding member to space said mold holding member from a manufacturing floor;
   a carriage device cooperable with said mold holding member for engaging and moving the mold assembly to one of said opposite surfaces; and
   a lifting mechanism positioned on the other of said opposite surfaces for moving said carriage device relative said mold holding member to move the mold assembly to be engaged with said mold holding member with said lifting mechanism applying first force at one of said opposite surfaces and the mold assembly applying second force to the other of said opposite surfaces with first and second forces being applied against each other as said lifting mechanism engages and moves the mold assembly against said mold holding member to prevent said mold holding member from deflection and distortion to eliminate offset between the first mold portion and the second mold portion thereby eliminating defective parts as said apparatus forms the parts
   wherein said lifting mechanism is further defined by a first block presenting an engaging surface defined by a first portion and a second portion and a back side with each of said first and second portions presenting different angles defined between said first and second portions and said back side as viewed in a cross section.

2. An apparatus as set forth in claim 1, wherein said lifting mechanism is further defined by a second block having a pair of elements each presenting an engaging surface defined by a first portion and a second portion and a back side with each of said first and second portions of said pair of elements presenting different angles defined between said first and second portions and said back side as viewed in a cross section.

3. An apparatus as set forth in claim 2, wherein said back sides of each said elements include a tail portion extending therefrom and interconnected by a link to form a void to receive said first block as said first and second blocks are moved relative one another with said first block being moved substantially into and between said elements thereby moving said carriage device from said first portion and said second portion of said engaging surfaces of said first and second blocks thereby moving said carriage device above said mold holding member.

4. An apparatus as set forth in claim 3, including an actuator connected to said link and a threaded shaft extending from said link to said first block thereby mechanically engaging said first block to move said first block to and away from said second block thereby moving said carriage device relative said mold holding member at variable heights.

5. An apparatus as set forth in claim 2, wherein said mold holding member includes at least one track and said at least one of said first and second elements including a track engaging surface to facilitate slidable movement of said first and second blocks on said mold holding member relative said central axis.

6. An apparatus as set forth in claim 1, wherein said carriage device is further defined by a pair of shafts cooperable with said mold holding member and a bar element pivotably connected to said shafts and supported by said first and second blocks, each of said shafts including grip members for locking and moving the mold assembly to be engaged with said mold holding member with first and second forces being applied against one and the other as said lifting mechanism engages and moves the mold assembly against said mold holding member thereby preventing said mold holding member from deflection and distortion to eliminate offset between the first mold portion and the second mold portion thereby eliminating defective parts as said apparatus forms the parts.

7. An apparatus as set forth in claim 6, wherein said bar element includes a device presenting a plurality of rollers with some of said rollers slidably movable on said engaging surface of said first block and the other of said rollers slidably movable on said engaging surface of said second block.

8. An apparatus as set forth in claim 1, wherein said mold holding member is configured to perform injection molding operations thereby injecting there through at least one of metallic and organic materials between the first mold portion and the second mold portion thereby molding the part.

9. An apparatus as set forth in claim 1, wherein said mold holding member is configured to perform stamping operations wherein blanks of at least one of metallic and organic materials are placed between the first mold portion and the second mold portion thereby stamping the part.

* * * * *